United States Patent

Takacs

[15] 3,700,747
[45] Oct. 24, 1972

[54] ISOMERIZATION OF TERPENES

[72] Inventor: Edward Andrew Takacs, Norwalk, Conn.

[73] Assignee: American Cyanamid Company, Stamford, Conn.

[22] Filed: April 6, 1971

[21] Appl. No.: 131,831

Related U.S. Application Data

[63] Continuation-in-part of Ser. No. 845,432, July 28, 1969, abandoned.

[52] U.S. Cl.........260/675.5, 208/DIG. 2, 260/666 A
[51] Int. Cl........C07c 13/00, C09f 3/02, C01b 33/28
[58] Field of Search....................................260/675.5

[56] References Cited

UNITED STATES PATENTS 3,270,075  8/1966  Derfer et al. ...........260/675.5
3,377,400  4/1968  Wise.........................260/668

*Primary Examiner*—Delbert E. Gantz
*Assistant Examiner*—G. E. Schmitkons
*Attorney*—James H. Laughlin, Jr.

[57] ABSTRACT

A method for producing terpinolene is given whereby a terpene-containing feed is isomerized in the presence of a small amount of an alkali metal zeolite molecular sieve catalyst of the 13X-type.

10 Claims, No Drawings

ISOMERIZATION OF TERPENES

This application is a continuation-in-part of application Ser. No. 845,432 filed July 28, 1969, now abandoned.

This invention relates to an improved process for the isomerization of terpenes, in particular α-pinene, β-pinene, turpentine, and dipentene. More particularly, it relates to the production of terpinolene by isomerization of α-pinene, β-pinene, mixtures thereof, and dipentene by means of reacting the same in the presence of a selective catalyst.

Terpinolene is a unique article of commerce and is in demand for use in the production of flavor and fragrance derivatives and for the modification of synthetic polymers and copolymers. Terpinolene is found in certain naturally occuring oils as well as in some turpentine fractions and it is normally isolated as a by-product from these sources. This invention describes the chemical conversion of terpene containing feed stocks to terpinolene.

The prior art shows many examples of isomerization to produce desired products. For example, U.S. Pat. No. 2,382,641 issued to Kharasch teaches the conversation of optically active α-pinene to limonene which is the optically form of dipentene. Wystrach et al. in the Journal of the American Chemical Society, vol. 79, p. 5,786 (1957), describe the isomerization of α-pinene to a mixture of camphene and monocyclic alkadienes with the concomitant formation of about 15 to 35 percent polymer. But Frilette and Weisz in U.S. Pat. No. 3,140,322 use activated 10X zeolite to reduce polymer formation in the isomerization of α-pinene which has been found to yield camphene as the predominant product. In discussing the activity of 13X molecular sieves in the Journal of Physical Chemistry, vol. 64, p. 382 (1960) Frilette and Weisz state that "α-pinene undergoes no reaction when refluxed with the Na$^+$ form [13X zeolite], but is converted extensively to camphene by the Ca$^{++}$ salt [10X zeolite]." However, U. S. Pat. No. 3,270,075 issued to Derfer and Bordenca teaches the isomerization of a pinene to a dipentene-rich isomerizate with a 10X or 13X zeolite. This patent teaches that the use of higher temperatures is detrimental to the formation of cyclic-monoterpenes. None of these references describe techniques to produce terpinolene which is a member of the cyclic-monoterpene family.

It is an object of this invention to provide a process for producing terpinolene. A further object of this invention is to provide a process for producing terpinolene whereby the resulting amounts of this desirable product can be maximized. These and other objects of the present invention will become more apparent from a reading of the ensuing specification and examples.

It has been unexpectedly found that terpinolene can be obtained by isomerizing a terpene containing feed, such as, for example, α-pinene, β-pinene, dipentene, turpentine, and others in the presence of a selected catalyst. This is particularly surprising since heretofor there has been no recognition of the fact that terpinolene could be produced by isomerization. Moreover, it is unique in that terpinolene can be produced in a form which is readily separated from the reaction by-products. Furthermore, it has been uniquely found that the amount produced can be substantially increased by employing an isomerization conversion step which includes carrying the isomerization reaction to substantial completion.

In accordance with this invention any terpene including α-pinene, β-pinene, dipentene, or turpentine is isomerized in the presence of a zeolite catalyst of the 13X-type.

Zeolite X can be represented in terms of mole ration of oxide as follows:

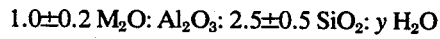

$$1.0 \pm 0.2\, M_2O : Al_2O_3 : 2.5 \pm 0.5\, SiO_2 : y\, H_2O$$

wherein M is an alkali metal, and y may be any value depending upon the identity of the alkali metal and the degree of hydration of the crystal. The active sodium form, for example, may be represented as follows:

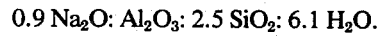

$$0.9\, Na_2O : Al_2O_3 : 2.5\, SiO_2 : 6.1\, H_2O.$$

Typically, an anhydrous synthetic sodium zeolite of the 13X type has the composition $Na_{86}(Al_2)_{86}(SiO_2)_{106}$ and an effective pore diameter of about 13 Angstroms. The crystalline structure is such that the typical sieve has a large number of pores characterized by exceptionally uniform size. These catalysts are sold commercially as aqueous slurries or substantially dehydrated having water contents of about 1 percent. Other alkali metal sieves including lithium and potassium sieves are similar to the sodium sieve which for the purpose of this disclosure is representative. The alkali metal aluminosilicates of the present invention are further described in a number of U.S. Pats. including No. 2,882,244.

The molecular sieve catalysts employed in this invention are operative over a wide range of water content as well as in the anhydrous form. Wet catalyst can be dried to a temperature of from about 100° C. to about 400° C. and preferably about 300° C. so as to obtain a catalyst having water content of about 2 to about 6 percent, and preferably 4 percent. It has also been found that wet or anhydrous molecular sieve catalysts can be increased in activity by washing and then drying.

I have surprisingly found that when a selected catalyst of the 13X sieve type is employed in a terpene isomerization reaction, terpinolene is produced.

In one embodiment of this invention a pinene containing feed in isomerized employing less than about 10 percent based upon the weight of the feed of a 13X molecular sieve zeolite catalyst. Terpinolene is immediately formed and the reaction may be stopped at any time and the terpinolene separated by fractionation or other separation process. More surprising, however, I have found that when the pinene is substantially consumed, that is, when the reaction has gone to 90 percent completion and more, the amount of terpinolene produced is substantially maximized.

The isomerization process of the present invention is not temperature critical and may be carried out at any temperature. Preferred reaction temperatures are in the range from about 100° C. to about 200° C. and more preferably from about 150° C. to about 190° C.

In general, reaction times are not critical and from 1 to 15 hours may be employed. For convenience I have found that reaction times of from 2 to 5 hours are satisfactory. The catalyst may be from about 0.1 percent to about 10 percent. For normal operation, however, from about 0.25 percent to about 5 percent are preferred. A particularly desirable range is from about 0.25 to 2 percent. The process may be carried out either batch-wise or continuously, but batch processing is preferred. Further, the process may be carried out under autogenous, elevated, or reduced pressures.

The process of this invention is unique in that while broad non-critical isomerization conditions provide a satisfactory yield of terpinolene, the desired product can be maximized to a much higher level by permitting the pinene isomerization reaction to go to substantial completion, that is, permitting the reaction to go to 90 percent completion and higher. Completion to 95 percent or more is preferred for total maximization.

While I do not wish to be bound by theory, I believe that terpinolene is formed from terpines through the mechanism of an unstable intermediate which can be generated from α-pinene, β-pinene, turpentine, dipentene, and other terpenes. The mechanism may be represented as follows:

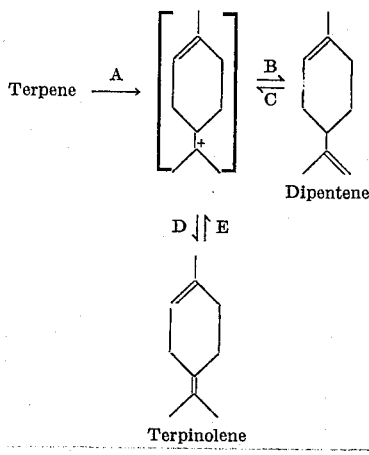

As the isomerization of the terpene begins, the amount of terpene, such as pinene, for example, is large and both terpinolene and dipentene are formed. As the reaction goes to completion, that is, as the terpene is nearly all converted, the reaction of converting the unstable intermediate to dipentene appears to substantially reverse so that dipentene is isomerized in the presence of the catalyst to terpinolene. The reaction of pinenes to the unstable intermediate is substantially irreversible and the reaction of intermediate to terpinolene favors the more stable terpinolene. Thus, it appears that when the reaction rate A becomes small, C becomes large thus increasing the yield of terpinolene.

Not only is the reaction to terpinolene novel and unexpected, but my further finding that the reaction can be maximized is also surprising. I have found that any amount of terpene conversion will produce some terpinolene, but to maximize the terpinolene yield conversion to 90 percent and more is necessary. A wide variety of process conditions may be employed to carry out the conversion to maximization. For example, higher temperatures may be employed with low catalyst loadings or the amount of catalyst may be increased while the temperature is kept low. Another method would keep both temperature and catalyst values low while extending the reaction time. Those skilled in the art will readily be able to operate this invention so as to maximize the terpinolene yield for their particular circumstances. In general, I prefer the condition mentioned above.

The following examples further illustrate the present invention and are not intended to limit the scope thereof in any manner. Unless otherwise stated, all parts and percentages are by weight.

EXAMPLE I

PART 1

500 pounds of 13X molecular sieves (Linde Division of Union Carbide Corporation) were charged to a kettle containing 200 gallons deionized water. The mixture was then slurried for 30 minutes and filtered, the effluent being sewered. The filter cake was dried 16 hours at 300° C.

PART 2

A kettle was purged with nitrogen and charged with 3,900 pounds of α-pinene. 39 pounds of the catalyst of part 1 of this example were then added while agitating. The port was then closed, and the temperature raised rapidly. The mixture began to reflux at 162° C., and within 5 hours had reached 172.5° C. Cooling water was then turned on. The cooled mixture was pumped through a filter press with the isomerizate which was subsequently fractionated.

The isomerizate yielded 407 pounds of terpinolene.

EXAMPLE II

The procedure of example I was repeated in every detail except that β-pinene was used as the feedstock.

The isomerizate, on fractionation, yielded 443 pounds terpinolene.

EXAMPLE III

The procedure of example I was followed in every detail, except that sulfate turpentine was used as the feedstock.

The isomerizate, on fractionation, yielded 472 pounds terpinolene.

EXAMPLE IV

To determine the influence of the temperature at which the catalyst was dried and, indirectly, of moisture content on the rate of the isomerization reaction, the following series of experiments was carried out.

Hydrated 13X catalyst was dried at various temperatures ranging from ambient temperatures to 600° C., and the dried catalyst thus obtained was evaluated with regard to its activity towards α-pinene in the following manner.

2 grams of catalyst were contacted with 100 grams of α-pinene, and the resulting mixture was heated isothermally under nitrogen at 160° C. Samples of product mixture were withdrawn periodically and analyzed by gas-liquid chromatography. Essentially no polymerized products were formed. The results obtained are shown in table I.

EXAMPLE V

A 250 milliliter round bottom flask equipped with magnetic stirring bar, thermometer, condenser, and a gas inlet tube was charged with 100 grams of freshly distilled α-pinene (98.3 percent pure) and 5 grams of powdered, molecular sieve, 13X catalyst of the type employed in example I. The mixture was purged with nitrogen and the contents of the flask were quickly heated to reflux in approximately 20 minutes. Heating was continued until the pot temperature reached 173° C. The reaction mixture was then quenched, filtered to remove the catalyst, and analyzed.

The analysis found 10.3 grams of terpinolene.

EXAMPLE VI

A 250 milliliter round bottom flask equipped as in example V was charged with 100 grams of freshly distilled α-pinene (98.3 percent pure) and 1 gram of the potassium analog of 13X molecular sieve which was supplied by the Linde Division of Union Carbide. This mixture was heated under nitrogen to reflux for 47 hours. The pot temperature rose from 154.5° to 170° C. and the reaction mixture was quenched, filtered to remove the catalyst and analyzed.

The analysis showed 5.6 grams of terpinolene produced.

EXAMPLE VII

Example VI was repeated except that 10 grams of potassium sieve were employed and the reaction contained in a pressure vessel under autogenous pressure for 3½ hours. The analysis found 5.3 grams of terpinolene.

TABLE II

| Reflux Time Minutes | Pinene converted | Analysis[1] |
|---|---|---|
| 150 | 69% | dipentene 64.9%; terpinolene 10.4% |
| 240 | 83% | dipentene 65.5%; terpinolene 10.5% |
| 330 | 91% | dipentene 65.2%; terpinolene 11.4% |
| 450 | 95% | dipentene 62.8%; terpinolene 12.1% |
| 1440 | 98% | dipentene 59.9%; terpinolene 17.1% |

[1] Based on percent pinene consumed.

EXAMPLE IX

Example VIII was repeated except that a 5 gram charge of the activated molecular sieve 13X catalyst was employed. The results obtained are shown in table III.

TABLE III

| Reflux Time Minutes | Pinene converted | Analysis[1] |
|---|---|---|
| 10 | 80% | dipentene 64.4%; terpinolene 10.5% |
| 15 | 90% | dipentene 64.8%; terpinolene 10.8% |
| 20 | 94% | dipentene 64.3%; terpinolene 10.9% |
| 60 | 97% | dipentene 63.0%; terpinolene 13.2% |
| 75 | 98.2% | dipentene 59.6%; terpinolene 18.0% |

[1] Based upon percent pinene consumed.

TABLE I

[Effect of H₂O concentration on reactivity of molecular sieve 13X during isomerization of α-pinene]

| Catalyst source | Catalyst conc., percent | Water content of catalyst, percent | Reaction temp., °C | Time (min.) to attain reaction temp. | Percent conversion of α-pinene (hr.) | | | | | | | | | Percent yield of products based on pinene consumed at maximum indicated conversion [a] |
|---|---|---|---|---|---|---|---|---|---|---|---|---|---|---|
| | | | | | 1 | 1½ | 2 | 2½ | 3 | 3½ | 4 | 4½ | 5 | 5½ | 6 | |
| A | 2 | 28.0 | 160 | 120 | 30.0 | | 38.7 | | 45.6 | | 49.3 | 51.4 | | | | Dipentene, 67.8; camphene, 18.4; terpinolene, 8.9. |
| B | 2 | 10.5 | 160 | 60 | 41.2 | | 52.6 | | 61.3 | | 68.8 | | 73.3 | | | Dipentene, 66.6; camphene, 18.2; terpinolene, 9.4. |
| C | 2 | 9.4 | 160 | 30 | 55.9 | | 71.2 | | 80.4 | | 86.7 | | 90.7 | | 94.2 | Dipentene, 63.2; camphene, 17.6; terpinolene, 11.0. |
| D | 2 | 5.3 | 160 | 13 | 75.3 | | 87.8 | 91.6 | 94.2 | | | | | | | Dipentene, 62.2; camphene, 18.0; terpinolene, 11.4. |
| E | 2 | 4.3 | 160 | 12 | 86.6 | 91.8 | 94.8 | | | | | | | | | Dipentene, 63.8; camphene, 18.3; terpinolene, 11.1. |
| F | 2 | 4.5 | 160 | 12 | 53.5 | | 71.6 | | 80.8 | | 87.4 | | 92.7 | | 94.8 | Dipentene, 64.0; camphene, 17.5; terpinolene, 10.8. |

[a] Less than one-half percent non-volatiles found in isomerizate.

A = Catalyst slurry air dried at ambient temperature.
B = A (above) dried at 150° C.
C = A (above) dried at 200° C.
D = A (above) dried at 250° C.
E = A (above) dried at 300° C.
F = A (above) dried at 600° C.

EXAMPLE VIII

A round bottom flask equipped as in example V was charged with 100 grams of α-pinene and 0.25 grams of activated (as in example I, part 1) 13X molecular sieve catalyst. The system was purged with nitrogen, stirring initiated, and the contents of the flask quickly heated to reflux. Samples were withdrawn periodically and examined. Heating was continued until almost all of the pinene had been consumed. The results obtained are shown in table II.

EXAMPLE X

Example VIII was repeated except that a 10 gram charge of the activated molecular sieve 13X was employed. The results obtained are shown in table IV.

TABLE IV

| Reflux Time Minutes | Pinene converted | Analysis[1] |
|---|---|---|
| 10 | 93% | dipentene 63.9% camphene 18.4; terpinolene 10.8% |
| 30 | 96.4% | dipentene 62.8% camphene 18.1; terpinolene 13.0% |
| 60 | 99.0% | dipentene 58.0% camphene 17.3; terpinolene 19.5% |

[1] Based upon percent pinene consumed.

EXAMPLE XI

A round bottom flask equipped as in example VIII was charged with 100 g. of d-limonene an optically active form of dipentene, (96.2 percent pure) and one gram of activated molecular sieve 13X catalyst. The system was flushed with nitrogen, stirring initiated, and the mixture quickly heated to reflux. After 7.5 hours during which time the pot temperature at reflux rose from 172° to 180° C., the reaction mixture was cooled, filtered and analyzed. The results obtained are shown in table V.

TABLE V

| Product | Absolute Percent Found |
|---|---|
| (1) | 36.0% |
| (2) terpinolene | 32.0% |
| (3) other terpene hydrocarbons | 32.0% |
| (4) non volatiles | <.5 |

EXAMPLE XII 20 grams of molecular sieve of the 13X-type was added to a solution of 68.9 grams of $LiNO_3$ in 500 cc distilled water, slurried for 15 minutes and then filtered. The filter cake was removed, and the above treatment was repeated twice. The final filter cake was washed with distilled water to remove residual $LiNO_3$ and was then dried for 16 hours at 300° C.

The round bottom flask equipped as shown in example VIII was charged with 100 gm. α-pinene (98.3 percent pure) one gram of the lithium analog of 13X catalyst.

The flask was flushed with nitrogen, stirring initiated, and the contents of the flask quickly heated to reflux. After 3 hours, the pot temperature had reached 171° C. The reaction mixture was then quenched, filtered to remove catalyst, and the filtrate analyzed. The analysis is shown in table VI.

TABLE VI

| Product | Absolute Percent Found |
|---|---|
| α-pinene | 8.2% |
| dipentene | 47.8% |
| camphene | 18.4% |
| terpinolene | 18.0% |
| others | 7.6% |

From the above examples it is clearly shown that by employing the technique of this invention, terpinolene can be produced in satisfactory amounts and these amounts can be maximized. This is clearly unexpected and surprising.

While certain specific embodiments and preferred modes of practice have been set forth, it will be understood that these are solely for purposes of illustration and that various changes and modifications may be made without departing from the spirit of the disclosure or the scope of the appended claims.

I claim:

1. A method for producing terpinolene comprising isomerizing a terpene containing feed in the presence of a zeolite molecular sieve catalyst of the 13X-type containing an alkali metal cation selected from the group consisting of sodium, potassium, and lithium.

2. The method of claim 1 wherein the terpene containing feed is predominately α-pinene.

3. The method of claim 1 wherein the terpene containing feed is predominately β-pinene.

4. The method of claim 1 wherein the terpene containing feed is predominately turpentine.

5. The method of claim 1 wherein the terpene containing feed is predominately dipentene.

6. The method of claim 1 wherein the alkali metal cation is sodium.

7. A method for producing terpinolene comprising isomerizing a terpene selected from the group of α-pinene, β-pinene, turpentine, and dipentene containing feed at a temperature of from about 100° to about 200° C. in the presence of from about 0.1 percent to about 10 percent based upon the weight of the feed of a molecular sieve zeolite catalyst of the 13X-type containing alkali metal cation selected from the group consisting of sodium, potassium, and lithium, said terpene isomerization reaction going to at least 90 percent completion.

8. The method of claim 7 wherein the terpene isomerization reaction goes to at least 95 percent completion.

9. The method of claim 7 wherein the temperature is from about 150° to about 190° C.

10. The method of claim 7 wherein the terpene isomerization reaction is carried out in the presence of about 0.25 percent to about 5 percent catalyst.

* * * * *